United States Patent [19]
Engwall

[11] Patent Number: 5,096,525
[45] Date of Patent: Mar. 17, 1992

[54] APPARATUS AND METHOD FOR FORMING AND BONDING A THERMOPLASTIC PART FROM THERMOPLASTIC BLANKS

[75] Inventor: Dwight L. Engwall, Wichita, Kans.

[73] Assignee: The Boeing Company, Seattle, Wash.

[21] Appl. No.: 405,778

[22] Filed: Sep. 12, 1989

[51] Int. Cl.⁵ .............................................. B32B 31/00
[52] U.S. Cl. .................................... 156/196; 52/729; 156/308.2; 156/309.9; 156/443; 156/583.1; 264/241; 264/248; 428/174
[58] Field of Search .................. 156/309.9, 196, 443, 156/308.2, 583.1, 222; 264/241, 248; 52/729; 428/174

[56] References Cited
U.S. PATENT DOCUMENTS

| | | | |
|---|---|---|---|
| 3,001,901 | 9/1961 | Barkley | 156/222 |
| 3,328,931 | 7/1967 | Smith | 52/729 |
| 3,845,544 | 11/1974 | Nurminen et al. | 52/729 |
| 4,123,217 | 10/1978 | Fletcher et al. | |
| 4,274,276 | 6/1981 | Mettler | |
| 4,969,966 | 11/1990 | Norman | 156/222 |

Primary Examiner—John J. Gallagher
Attorney, Agent, or Firm—Finnegan, Henderson, Farabow, Garrett & Dunner

[57] ABSTRACT

An apparatus and a method for forming a thermoplastic part from thermoplastic blanks are disclosed. The apparatus includes first and second male dies, each having a shape defining the internal dimensions of first and second portions of the part, respectively. A female die has opposed first and second open ends, each being shaped to receive the first and second male dies, respectively, with predetermined clearances. Fixed to a stationary platform are springs for selectively resisting the movement of a support for the second male die toward the platform. The springs control the forming pressure between the first and second male dies in mating relation with the female die to form the part.

8 Claims, 2 Drawing Sheets

APPARATUS AND METHOD FOR FORMING AND BONDING A THERMOPLASTIC PART FROM THERMOPLASTIC BLANKS

BACKGROUND OF THE INVENTION

1. Field of the Invention

The present invention relates to an apparatus and a method for forming and bonding a thermoplastic part from thermoplastic blanks.

2. Description of the Related Art

The conventional method of manufacturing a complex part of thermoplastic material requires forming the component elements of the part into desired shapes and bonding the component elements together. The forming step entails heating thermoplastic blanks and, by means of a die, shaping the blanks and cooling the blanks to retain the desired shape. The bonding step entails heating the shaped component parts to melt temperature and fusing them together at the appropriate locations. Fusion bonding of preshaped thermoplastic parts presents a problem. It is necessary to heat the areas of the parts which are to be fused to melt temperature for a sufficient time to permit fusion under pressure. Such heating, however, must be carefully controlled to avoid delamination or loss of shape of the areas of the parts which are not to be bonded to other parts.

The present invention provides an apparatus and method for manufacturing complex thermoplastic parts wherein the component parts are simultaneously shaped and fusion bonded in a manner which prevents delamination and provides dimensional stability to the component parts during fusion bonding.

Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided an apparatus for forming a thermoplastic part having first and second opposed portions from thermoplastic blanks, the apparatus comprising: a stationary platform; a first male die fixed on the platform, the first male die having a shape defining the internal dimensions of the first portion of the part; a second male die having a shape defining the internal dimensions of the second portion of the part; means for supporting the second male die in opposed relation to the first male die for selective movement relative thereto; a female die having opposed first and second open ends, the first open end defining the external dimensions of the first portion of the part and being shaped to receive the first male die with a predetermined clearance and the second open end defining the external dimensions of the second portion of the part and being shaped to receive the second male die with a predetermined clearance; means fixed to the platform for aligning the female die in operative orientation between the first and second male dies; and means fixed to the platform for resiliently holding the female die in operative orientation, the holding means selectively resisting movement of the supporting means towards the platform for controlling the forming pressure between the first and second male dies in mating relation with the female die to form the part.

In accordance with the present invention there is further provided a method for forming a thermoplastic part having first and second opposed portions from thermoplastic blanks, the method comprising the steps of: positioning one of the blanks between a first male die disposed on a fixed platform and a first open end of a female die having opposed first and second open ends and being resiliently supported by the platform in spaced relation from the first male die, the first male die having a shape defining the internal dimensions of the first portion of the part; positioning the other of the blanks between a second male die disposed for selective movement relative to the first male die and the second open end of the female die, the second male die having a shape defining the internal dimensions of the second portion of the part, the first open end defining the external dimensions of the first portion of the part and being shaped to receive the first male die with a predetermined clearance and the second open end defining the external dimensions of the second portion of the part and being shaped to receive the second male die with a predetermined clearance; maintaining the blank at a predetermined temperature during the forming and bonding operation; selectively moving the second male die toward the first male die to form the other blank into the second portion between the second male die and the second open end and moving the female die toward the first male die in opposition to the platform to form the one blank into the first portion between the first male die and the first open end; and fusing together in opposed relation the first and second portions in the female die to form the part.

BRIEF DESCRIPTION OF THE DRAWINGS

The accompanying drawings, which are incorporated in and constitute a part of the specification, illustrate a presently preferred embodiment of the invention and, together with the general description given above and detailed description of the preferred embodiment given below, serve to explain the principles of the invention.

DESCRIPTION OF THE PREFERRED EMBODIMENTS

Reference will now be made in detail to the present preferred embodiment of the invention as illustrated in the accompanying drawings.

Figure 1:
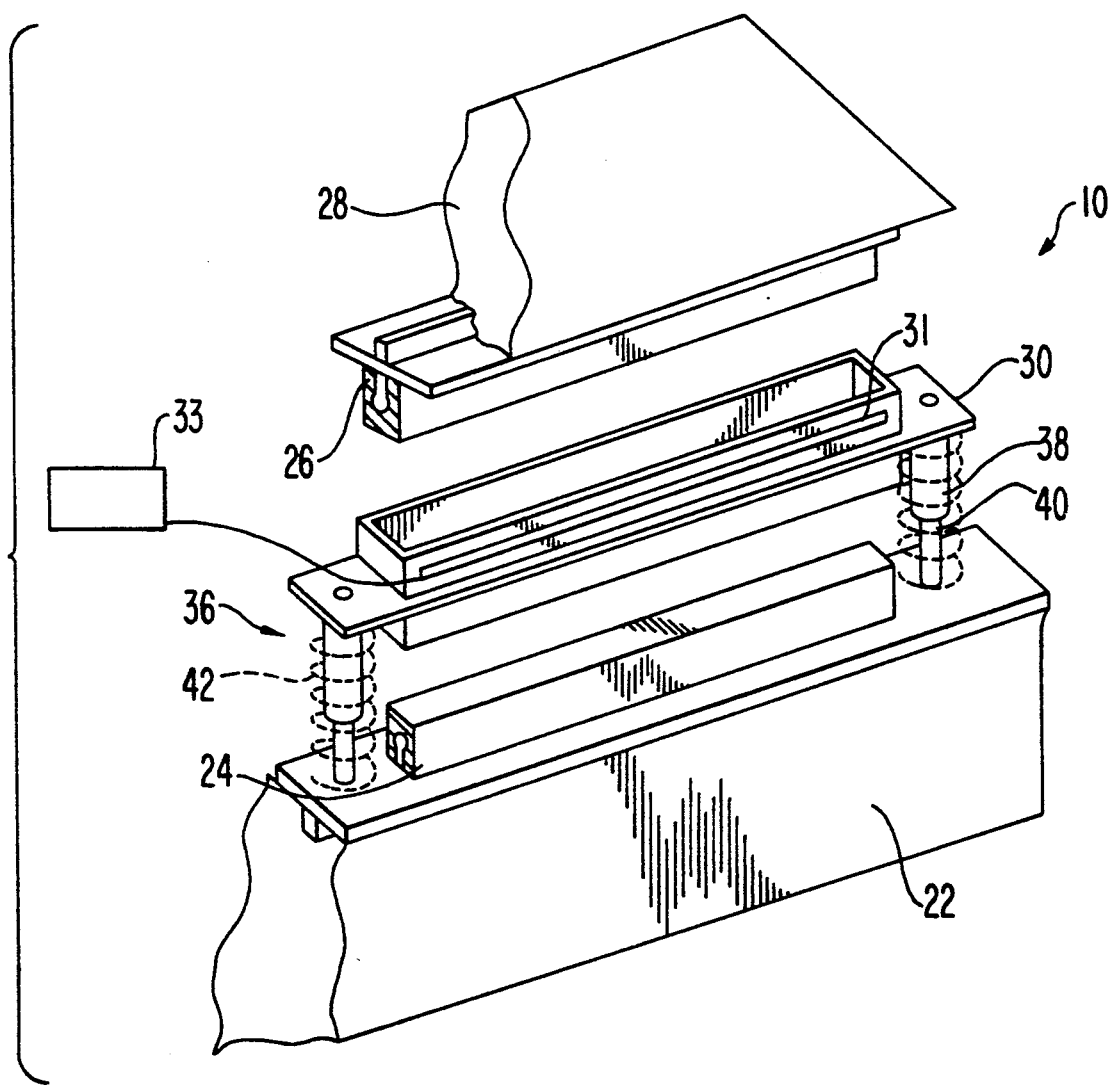
FIG. 1 is a perspective view of an apparatus for forming a thermoplastic part incorporating the teachings of the present invention.

A preferred embodiment of the apparatus for forming a thermoplastic part from thermoplastic blanks is shown in FIG. 1 and identified generally by reference numeral 10. Two thermoplastic blanks 12, 14 are shown in FIGS. 2–5, and a thermoplastic part 16 is shown in FIG.

5 in its final form. Thermoplastic part 16 includes first and second opposed portions 18 and 20, respectively.

In accordance with the present invention, the apparatus includes a stationary platform. In a preferred embodiment as shown in FIG. 1, stationary platform comprises a brake press bed 22.

In accordance with the invention, the apparatus comprises a first male die supported by the platform and a second male die, the first and second male dies each having a shape defining the internal dimensions of the respective first and second opposed portions of the part. As embodied herein and shown in FIGS. 1-4, a first male die 24 is disposed on brake press bed 22 and has a shape which defines first portion 18 of part 16. Preferably, first male die 24 is composed of a flexible material with good insulating and heat resistant properties such as silicone rubber so that the blank is kept at bonding temperature throughout the bonding and forming operation. Alternatively, the male die 24 is formed of metal (such as steel, aluminum, or titanium) which may be provided with heating means, such as heating elements, which maintain the blank at bonding temperature. Second male die 26 is disposed in opposition to first male die 24 and has a shape defining the internal dimensions of second portion 20 of part 16. Preferably, second male die 26 is also composed of the same material as the first male die.

In accordance with the present invention there is further provided means for supporting the second male die in opposed relation to the first male die for selective movement relative thereto. In a preferred embodiment the supporting means includes a brake press ram 28 as shown in FIG. 1. Brake press ram 28 supports second male die 26, which is disposed in opposed relation to first male die 24. Brake press ram 28 thereby provides for selective movement of first male die 24 relative to second male die 26.

In accordance with the invention, the apparatus includes a female die having opposed first and second open ends, the first open end defining the external dimensions of said first portion of the part and being shaped to receive the first male die with a predetermined clearance and the second open end defining the external dimensions of the second portion of the part and being shaped to receive the second male die with a predetermined clearance. As shown in FIGS. 1-4, a female die 30 includes opposed first and second open ends, 32 and 34, respectively. First open end 32 defines the external dimensions of first portion 18 of part 16 and is shaped to receive first male die 24 with a predetermined clearance. Second open end 34 defines the external dimensions of second portion 20 of part 16 and is shaped to receive second male die 26 with predetermined clearance. The clearances between female die openings 32, 34 and respective male dies 24, 26 are generally selected to correspond to the thickness of the thermoplastic blanks. Preferably, female die 30 is composed of metal (such as steel, aluminum, or titanium) so that the die may be heated to maintain the blanks at bonding temperature throughout the forming and bonding operation.

As embodied and broadly described herein, the present invention includes means fixed to the platform for aligning the female die in operative orientation between the first and second male dies. The aligning means includes a positioning pin structure, shown generally at 36 in FIG. 1, disposed between platform 22 and female die 30. Positioning pin 36 includes a first hollow rod 38 fixed to female die 30 and a second rod 40 fixed to platform 22. Second rod 40 is telescopically received in first rod 38 permitting guided relative movement between female die 30 and platform 22. Preferably, a pair of positioning pin structures 36 are provided and disposed to align opening 32 of female die 30 with first male die 24.

As embodied and broadly described herein, the present invention further includes means fixed to the platform for resiliently holding the female die in the operative orientation, the holding means selectively resisting movement of the female die towards the platform for controlling the forming pressure between the first and second dies in mating relation to the female die to form the part. The holding means includes a spring 42 extending between female die 30 and brake press bed 22 disposed about positioning pin structure 36. Spring 42 selectively resists the movement of brake press ram 28 toward brake press bed 22, thereby controlling the forming pressure between first and second male dies 24 and 26, respectively.

It is preferable that the apparatus for forming thermoplastic part includes means for heating the female die. Additionally, means for heating the male dies is preferred if the dies are made of metal or another heat conductor instead of a heat insulator as in the preferred embodiment. In a preferred embodiment, the heating means includes electric heating elements 31 for heating of the female die 30 to a predetermined temperature.

Preferably, there is further provided means for controlling the temperature of the female die. The temperature control means 33 alternatively may include an off-the shelf temperature sensing device such as a thermocouple, monitor and controller (such as commonly sold under the names "OMEGA" or "CHROMOLOX"), or a non-contact temperature sensing device such as an infrared sensor.

Figure 2:
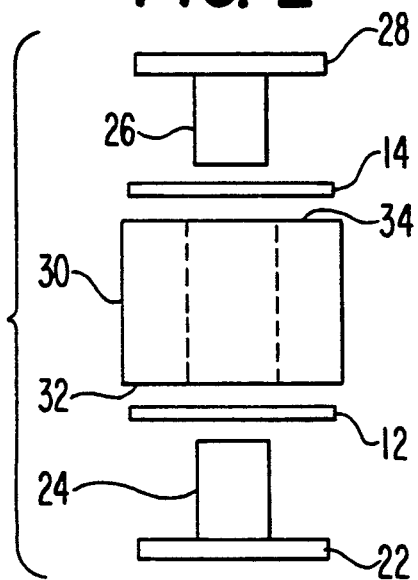
FIG. 2 is an end view of the apparatus of FIG. 1 with thermoplastic blanks in place before relative motion of the apparatus components.

A method of forming a thermoplastic part from two planar thermoplastic blanks using the apparatus of the present invention will now be described in particular with respect to FIGS. 2-5. Prior to the forming operation the blanks 12 and 14 are heated to bonding temperature in an oven (not shown). As shown in FIG. 2, the method first comprises the step of positioning blank 12 between first male die 24, which is disposed on brake press bed 22, and first open end 32 of female die 30. Second blank 14 is then positioned between second male die 26 and second open end 34 of female die 30. In the preferred embodiment the female die 30 is heated to a predetermined temperature.

Figure 3:
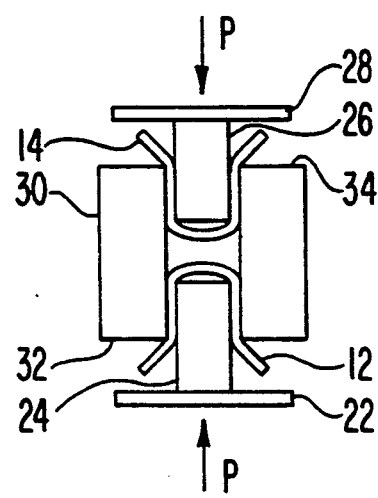
FIG. 3 is an end view of the apparatus of FIG. 2 at an intermediate state of the forming process.

As shown in FIG. 3, second male die 26 is then selectively moved toward first male die 24, which is fixed on brake press bed 22. This movement forms second blank 14 into second portion 20 of thermoplastic part 16. Also, female die 30 is moved toward first male die 24, in opposition to platform 22. This movement forms first blank 12 into a first portion 18 of the thermoplastic part 16.

Figure 4:
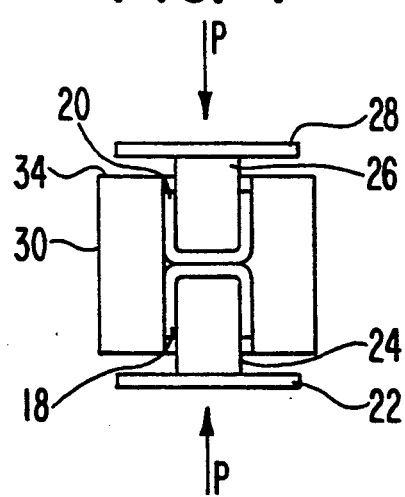
FIG. 4 is an end view of the apparatus of FIG. 2 during the fusion bonding stage of the forming process.
Figure 5:
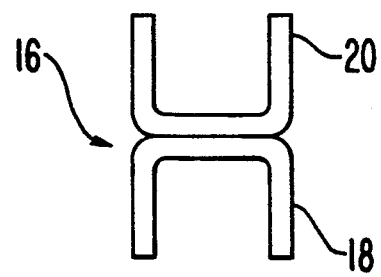
FIG. 5 is an end view of the finished part formed in accordance with the principles of the present invention.

As shown in FIG. 4, first and second portions 18 and 20, respectively, of thermoplastic part 16 are then fused together in opposed relation. This fusion thereby forms thermoplastic part 16 into its finished state, as shown in FIG. 5.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit of scope of the general inventive concept as defined by the appended claims and their equivalents.

What is claimed is:

1. A method for forming a composite thermoplastic part from first and second thermoplastic blanks, the method comprising the steps of:
   heating said blanks to a temperature sufficient to permit thermoforming;
   positioning the first blank between a first male die and a first open end of a female die and the second blank between a second male die and a second open end of the female die; and
   moving the second male die toward the first male die to shape the blanks and fuse the shaped blanks together.

2. The method of forming a thermoplastic part according to claim 1 wherein the step of positioning comprises:
   positioning the first male die disposed on a platform;
   positioning the female die resiliently supported by the platform in spaced relation to the first male die; and
   positioning the second male die disposed for selective movement relative to the first male die.

3. The method of forming a thermoplastic part according to claim 2 wherein said moving step comprises the steps of:
   selectively moving the second male die toward the first male die to shape the second blank between the second male die and the second open end;
   selectively moving the female die toward the first male die in opposition to the platform to shape the first blank between the first male die and the first open end; and
   fusing the first and second formed blanks together.

4. A method for forming a composite thermoplastic part having first and second opposed portions from thermoplastic blanks, the method comprising the steps of:
   heating said blanks to a temperature sufficient to permit thermoforming;
   positioning one of the blanks between a first male die disposed on a fixed platform and a first open end of a female die having opposed first and second open ends and being resiliently supported by the platform in spaced relation from the first male die, the first male die having a shape defining the internal dimensions of the first portion of the part;
   positioning the other of the blanks between a second male die disposed for selective movement relative to the first male die and the second open end of the female die, the second male die having a shape defining the internal dimensions of the second portion of the part, the first open end defining the external dimensions of the first portion of the part and being shaped to receive the first male die with predetermined clearance corresponding to the thickness of the one blank and the second open end defining the external dimensions of the second portion of the part and being shaped to receive the second male die with predetermined clearance corresponding to the thickness of the other blank;
   selectively moving the second male die toward the first male die to shape the other blank into the second portion between said second male die and said second open end and moving the female die toward the first male die in opposition to the platform to shape the one blank into the first portion between the first male die and the first open end; and
   fusing together in opposed relation the first and second portions in the female die to form the part.

5. The method of forming a thermoplastic part according to claim 4 further comprising the step of heating at least one of the dies to a predetermined temperature.

6. The method of forming a thermoplastic part according to claim 5 where said heating step heats the female die.

7. A method for forming a thermoplastic part from at least two blanks comprising the steps of:
   heating each blank to a temperature sufficient for thermoforming;
   thermoforming one blank in each opposed end of a hollow, selectively heated mold into a predetermined configuration having a contact surface; and
   bonding together in said mold the contact surfaces of said thermoformed blanks.

8. A method for forming from first and second thermoplastic blanks a thermoplastic I-beam having opposed U-shaped components, the method comprising the steps of:
   heating said blanks to a temperature sufficient for thermoforming;
   positioning the first heated blank between a first male die and a first open end of a selectively heated, hollow female die and the second blank between a second male die and an opposed second open end of the female die, the male dies and the opposed open ends of the female die cooperatively defining said U-shaped components; and
   moving the second male die toward the fist male die to shape the U-shaped components and to fuse the shaped components together at their bases.

* * * * *